United States Patent [19]

Wyland

[11] 4,110,632
[45] Aug. 29, 1978

[54] DEVICE, METHOD AND SYSTEM FOR CONTROLLING THE SUPPLY OF POWER TO AN ELECTRICAL LOAD

[75] Inventor: Alvin D. Wyland, Williamsburg, Iowa

[73] Assignee: General Electric Company, Fort Wayne, Ind.

[21] Appl. No.: 763,481

[22] Filed: Jan. 28, 1977

Related U.S. Application Data

[63] Continuation of Ser. No. 711,703, Aug. 5, 1976, abandoned.

[51] Int. Cl.$^2$ .............................................. H01H 37/00
[52] U.S. Cl. ................................. 307/117; 236/46 R; 307/39; 307/141
[58] Field of Search ............... 307/39, 141, 141.4, 307/141.8, 140, 38, 34, 35, 62, 117, 41; 235/151.21, 92 T, 92 MT; 236/46 R; 62/231

[56] References Cited

U.S. PATENT DOCUMENTS

| | | | |
|---|---|---|---|
| 2,266,252 | 12/1941 | Osterheld | 219/39 |
| 2,385,525 | 9/1945 | McCloy | 62/4 |
| 2,679,602 | 5/1954 | Gallagher | 307/39 |
| 3,261,992 | 7/1966 | Coe | 307/117 |
| 3,527,445 | 9/1970 | Stewart et al. | 263/15 |
| 3,636,369 | 1/1972 | Harter | 307/141.4 |
| 3,737,671 | 6/1973 | Davis | 307/126 |
| 3,925,680 | 12/1975 | Dixon | 307/39 |
| 3,979,601 | 9/1976 | Franklin | 307/141 |
| 4,027,171 | 5/1977 | Browder | 307/39 |

*Primary Examiner*—Robert K. Schaefer
*Assistant Examiner*—Morris Ginsburg
*Attorney, Agent, or Firm*—Joseph E. Papin

[57] ABSTRACT

A device for controlling the supply of power to at least one electrical load. In this device, means is operable in response to generally uniform repetitive timing signals supplied thereto for counting through a plurality of successive predetermined time periods, and means is provided for monitoring a condition. Means is also provided for inhibiting the supply of power to the load when the monitored condition meets a preselected criteria thereof during at least one preselected part of selected ones of the predetermined time periods.

Methods and systems for controlling the supply of power to at least one electrical load are also disclosed.

27 Claims, 6 Drawing Figures

DEVICE, METHOD AND SYSTEM FOR CONTROLLING THE SUPPLY OF POWER TO AN ELECTRICAL LOAD

CROSS REFERENCE TO RELATED APPLICATION

This application is a continuation of parent application Ser. No. 711,703 filed Aug. 5, 1976, now abandoned, which is incorporated herein by reference.

BACKGROUND OF THE INVENTION

This invention relates in general to electrical controls and in particular to devices, systems and methods for controlling the supply of power to an electrical load.

One of the problems confronting some electrical utility companies is the peaking type-demands placed on their power generating equipment during some summer months by the wide spread usage of air conditioning apparatus particularly on rather hot days, and of course, other electrical utility companies are confronted with such peaking-type demands during some winter months due to the wide spread usage of electrical heating apparatus for dwellings as well as auxiliary electrical loads, such as water heaters for instance. In order to accommodate the peaking-type demands, electrical utility companies would ordinarily be forced into rather large expenditures for additional power generating capacity and equipment, but of course, such expenditures appear unattractive since such peaking-type demands presently may occur on an infrequent basis, i.e., generally only between 15 to 30 days a year.

In the past, various devices were utilized in different systems and different methods were employed to predeterminately limit the peaking-type demands on the power generating capacity of the electrical utility companies; however, one of the disadvantageous or undesirable features of at least some of such prior art devices is believed to be that they were generally much too complex both in design and operation so as to incur the resultant disadvantageous or undesirable feature of being generally too expensive for wide spread commercial usage in a power distribution system or network.

In some of the other prior art devices, electromechanical components were employed generally having at least some of the known disadvantageous or undesirable features which may be attendent to such components. Others of the prior art devices and systems utilize a radio-type signal emanated from the utility company to disconnect their power customers' loads from the power line; however, at least one of the disadvantageous or undesirable features of this particular prior art device and system is believed to be that the customers' loads may be disconnected for an inordinately long period of time at the whim of the utility company causing inconvenience and/or uncomfortable conditions for such customers. Also such radio actuated prior art devices and systems possibly could be undesirably actuated by a spurious signal. In still some others of the prior art devices and systems, a ripple signal is emanated from the utility company through their power network lines to disconnect their power customers' loads from the power line; however, at least one of the disadvantageous or undesirable features of this particular ripple signal device and system is believed to be that only certain segments of the power network may be taken off the line effecting inconvenience and/or uncomfortable conditions to the power customer in such certain segment while the other power customers' loads may be unaffected.

In another one of the prior art devices, the theory of its operation is generally based upon preconceived or predicted periods during which peaking-type demands were known to occur in the past. A photocell device is responsive generally to the first light of day for actuating a timer which, in effect, sets the prior art device to be operative only during the predicted period of peaking-type demands for taking the regulated load off the line. This prior art device is also provided with an atmospheric temperature sensing mechanism which is operable generally to take the load off the line if the sensed atmospheric temperature exceeds a selected value when such prior art device is set to operate during the predicted period. The load thereafter is off the line until the sensed atmospheric temperature falls below the selected value thereof and/or until the time of the predicted period of the peaking-type demand passes for that particular day.

An improvement over such prior art devices and systems is disclosed in my copending application Ser. No. 641,331 filed Dec. 16, 1975, now U.S. Pat. No. 4,020,358 issued Apr. 26, 1977, which discloses a time proportioning control for rationing power supplied to a load. In this patent, timing signals are established upon the occurrence of preselected criteria of a monitored condition, and a counter counts the established timing signals and provides an output upon reaching a predetermined count. Logic circuitry is responsive to the joint occurrence of an output signal and the continued existence of the preselected criteria of the monitored condition to inhibit the supply of electrical energy to the load.

SUMMARY OF THE INVENTION

Among the several objects of the present invention may be noted the provision of devices, methods and systems for controlling the supply of power to at least one load which overcome the above discussed disadvantageous features, as well as others, of the prior art; the provisions of such devices, methods and systems in which the inhibiting of the power supplied to the load may be overriden under certain conditions; the provision of such devices having a timing mechanism which can be reset to the correct time through connection with a portable, plug-in type service module; the provision of such devices, methods and systems having no moving parts; and the provision of such devices, methods and systems characterized by simplistic design, ease of assembling components therefor, and economy of manufacture and use. These as well as other objects and advantageous features of the present invention will be in part apparent and in part pointed out hereinafter.

In general, a device in one form of the invention is provided for controlling the supply of power to at least one electrical load. In this device, means is provided for timing through at least one predetermined time period. A pair of means are provided for monitoring a pair of conditions, and means for inhibiting the supply of power to the at least one load is operative when the monitored conditions meet preselected criteria therefor, respectively, only during a preselected time range within the at least one predetermined time period.

Still in general and in one form of the invention, a system is provided for controlling the supply of electrical energy from a source thereof to an electrical load. In this system, first means is provided for counting timing signals applied thereto and to sequentially increment a stored count of the timing signals to produce digital electric timing signals whose value is representative of the time of day. Digital processing means is responsive to the digital electric timing signals for producing digital electric time interval signals having unique values during the occurrence of at least one predetermined time interval during the day. Outdoor temperature sensing means produces a digital electrical outdoor temperature signal having a unique value when the sensed outdoor temperature is within a predetermined outdoor temperature range, and indoor temperature sensing means produces a digital electrical indoor temperature signal having a unique value when the sensed indoor temperature is within a predetermined indoor temperature range. Power demand inhibiting means is responsive to the presence of the respective time interval, indoor temperature and outdoor temperature signals of the aforesaid unique values for producing a demand control signal adapted to inhibit the supply of electrical energy to the load during the at least one predetermined time interval solely when both the indoor temperature and the outdoor temperature are within the predetermined ranges thereof.

Also in general and in one form of the invention, a system is provided for controlling the supply of power from an alternating current source thereof to at least one electrical load. In this system, means is operable generally in response to repetitive timing signals supplied thereto for counting through a plurality of predetermined time periods, and means is provided for connecting the counting means with the power source so that the alternating current thereof constitutes the timing signals. Means is provided for monitoring a condition, and means is connected in circuit relation with the counting means and the monitoring means for inhibiting the supply of power from the source thereof to the at least one electrical load when the monitored condition attains a preselected criteria therefor during at least one selected part of selected ones of the predetermined time periods.

Further in general, a method in one form of the invention is provided for controlling the supply of power to an electrical load. In this method, the steps include: counting timing signals through a predetermined time period with the timing signals comprising an alternating current source thereof and establishing a preselected range of time within at least a portion of the predetermined time period and monitoring an ambient condition during the predetermined time period; and inhibiting the supply of power to the load when the monitored condition attains preselected criteria therefor only during the preselected time range.

Still in general and in one form of the invention, another method is provided for controlling the supply of power to at least one electrical load. This method includes the steps of: timing through at least one predetermined time period and monitoring a pair of conditions during the at least one predetermined time period; and inhibiting the supply of power to the at least one load when the monitored conditions each meet preselected criteria therefor only during a preselected part of the at least one predetermined time period.

BRIEF DESCRIPTION OF THE DRAWINGS

Corresponding reference characters illustrate corresponding parts throughout the several views of the drawings.

The exemplifications set out herein illustrate the preferred embodiments of the invention in one form thereof, and such exemplifications are not to be construed as limiting, in any manner, the scope of the invention.

DETAILED DESCRIPTION OF THE PREFERRED EMBODIMENTS

Figure 1:
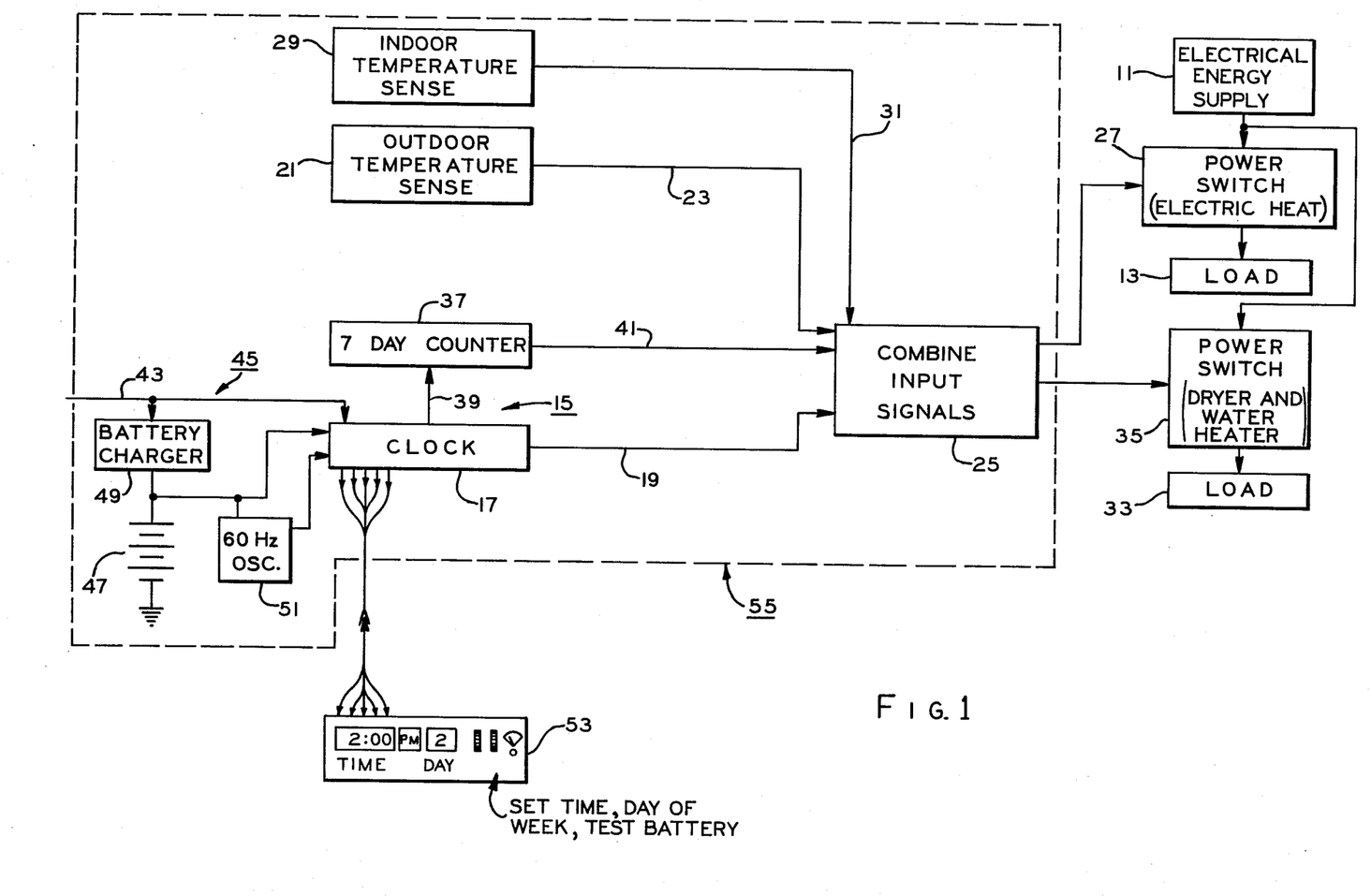
FIG. 1 is a functional block diagram illustrating a device and system for controlling the supply of power to a load in one form of the invention, respectively, and also teaching principles of methods in one form of the invention for controlling the supply of power to the load.

With reference to the block diagram of FIG. 1, a method in one form of the invention is illustrated for controlling the supply of power from a source 11 thereof to at least one electrical load, such as space heating apparatus 13 of an electrical utility company's customer. In this method, generally uniform repetitive timing signals constituted by a 60-cycle alternating current of a source thereof (not shown) are counted so as to establish a predetermined time period, such as for instance a daily or 24 hour period of time, and an ambient condition, such as atmospheric temperature for instance, is monitored during the predetermined time period. The supply of power from source 11 to load 13 is inhibited or interrupted only if the monitored condition attains a preselected criteria therefor during at least one preselected part of the predetermined time period.

More particularly, means for timing through the predetermined time period is indicated generally at 15 and includes means, such as an electronic clock 17 of a type known to the art, for counting the timing signals. Counting means or clock 17 is operable generally in response to the timing signals supplied thereto to provide output signals on a line 19 which are indicative of instantaneous time during the predetermined time period, and the components of the clock may be selectively interconnected so as to attain the aforementioned preselected part, such as any desired increment of time or time range, of the predetermined time period, as discussed in detail hereinafter. During the predetermined time period, condition responsive means or monitoring means, such as a temperature sensitive impedance device or sensor 21, senses or monitors the atmospheric or outdoor temperature, and upon the occurrence of a preselected criteria or temperature value of the outdoor temperature, such as for instance a value of 24° F., the sensor provides an output signal on line 23. Lines 19, 23 are both connected with means, such as logic circuitry 25, for inhibiting the supply of power to load 13, and the inhibiting means or logic circuitry is operable generally in response to the output signals of the sensor and counting means 17 to actuate a load power switch or contactor 27 to a switching position so as to interrupt the supply of power to the load but only when the preselected criteria of the monitored condition prevails during the preselected part of the predetermined time period.

In FIG. 1, there is also illustrated another method in one form of the invention for controlling the supply of power to load 13. This method includes timing through the predetermined time period, monitoring a pair of conditions, and inhibiting the supply of power to load 13 only if both of the monitored conditions meet respective preselected criteria therefor during the selected part of the predetermined time period.

More particularly, counting means 17, sensor 21 and logic circuitry 25 are interconnected and operate in the same manner as previously described, and one of the pair of monitored conditions is the outdoor temperature or another ambient condition sensed by the sensor 21, as also previously discussed. The other of the pair of monitored conditions is the indoor temperature of the space being heated by the load or space heating apparatus 13, and such indoor temperature is sensed or monitored by condition responsive means or monitoring means, such as a temperature sensitive impedance device or sensor 29, which is connected by a line 31 to logic circuitry 25. In the event the indoor temperature is above its preselected criteria or temperature value, say for instance 60° F., sensor 29 provides an output signal on line 31 which is, of course, transmitted to logic circuitry 25. Logic circuitry 25 is operable generally in response to the output signals of counting means 17 and sensors 21, 29 so as to interrupt the supply of power to load 13 but only if the monitored conditions of both the outdoor and indoor temperatures meet their respective preselected criteria during the aforementioned preselected part of the predetermined time period. In this manner, it may be noted that when the indoor temperature falls below its 60° F. preselected value, an output signal indicative thereof is transmitted by sensor 29 to logic circuitry 25 and causes it to override any output signal received from sensor 21 in the event the outdoor temperature has attained its 24° F. preselected value. Therefore, due to this override function or action of sensor 29, logic circuitry 25 operates to maintain the power supply to load 13 until the indoor temperature of the heated space is elevated through a preselected temperature differential or range of sensor 21 to about 70° F. This temperature differential of sensor 21 is due to hysteresis in the circuitry thereof. At this time, logic circuitry 25 is operable in response to counting means 17 and sensors 21, 29 to actuate power switch 27 and interrupt the supply of power to load 13, as previously described.

Other loads indicated generally at 33, such as for instance an electric motor heater and/or an electric clothes dryer or other selected electrical appliances, are connected with power source 11 through a power switch or contactor 35 and also with logic circuitry 25. Logic circuitry 25 is also operable in response to counting means 17 and sensors 21, 29, when the monitored conditions meet the respective criteria therefor during the selected part of the predetermined time period, to actuate power switch 35 to a switching position interrupting the supply of power from source 11 to other loads 33. Further, it may be noted that logic circuitry 25 is effective to maintain other loads 33 off the line irrespective of the energization of load 13 when sensor 29 operates to cause the logic circuitry to override the output signals of counting means 17 and sensor 21, as discussed above.

While the operations of the components discussed above with respect to the foregoing methods have been based on the predetermined time period which, as previously mentioned, may be a daily or 24 hour period, it may be desirable to effect such operations through a plurality of predetermined time periods, such as a weekly basis for instance. To this end, timing means 15 also includes a 7 day counter or counting means, such as a modulo eight counter 37, which implements counting means 17 and is connected between counting means 17 and logic circuitry 25 by a pair of lines 39, 41. Seven day counter 37 is incremented by an output signal on line 39 from counting means 17 at the end of each predetermined time period, i.e., every 24 hours for instance, so as to time through a plurality of the predetermined time periods, such as a 7 day week for instance. In this manner, counting means 17 transmits output signals indicative of the time of day on line 19 to logic circuitry 25, and upon incrementation, as discussed above, 7 day counter 37 transmits output signals indicative of the day of the week to the logic circuitry. As discussed in detail hereinafter, 7 day counter 37 may also be provided with a "skip-a-day" feature so as to be effective during only selected ones of the predetermined time periods, i.e., during week days when peak power demand is most apt to be present on the distribution system of the electrical utility company. Therefore, it is contemplated that seven day counter 37 may, in effect, make logic circuitry 25 nonresponsive to any output signals from sensors 21, 29 on a Saturday or Sunday when peak power demand is less likely to occur.

As previously discussed, counting means 17 is actuated in response to timing signals constituted by the alternating current of a source thereof (not shown), and such timing signals are transmitted to the counting means on a line 39. However, in the event of a power failure or outage on the distribution system of the electrical utility company, auxiliary means, such as a charging circuit 45, for supply timing signals to counting means 17 may be provided, if desired, and such auxiliary means or charging circuit includes a standby battery 47, a battery charger 49 and an oscillator 51. Of course battery charger 49 maintains the charge on battery 47 so as to enable oscillator 51 which provides timing signals to counting means 17 in the event of a power outage or loss of the normal 60-cycle line timing source, as discussed in detail hereinafter.

In the event timing means 15 for any reason loses or gains time so as to be out of diurnal synchronization, means for correcting the instantaneous time during the predetermined time periods, such as a portable, plug-in type service module 53, may be electrically associated with counting means 17 so as to correct the count thereof and conform its ouput signals on line 19 to the correct instantaneous time and the output signals on line 41 to the proper day of the week, as discussed in detail hereinafter.

Referring now to FIGS. 1, 2a, 2b and 2c in general and recapitulating at least in part with respect to the foregoing, there is illustrated generally at 55 a device in one form of the invention for controlling the supply of power from source 11 thereof to at least load 13, and the components of such device, as discussed below, are adapted to be encased or housed in a suitable casing or housing (not shown) therefor. Device 55 has timing means 15 operable generally in response to timing signals supplied thereto for timing through the predetermined time period and means, such as sensor 21, for monitoring a condition, such as the outdoor temperature or another ambient condition. Means, such as logic circuitry 25, is provided for inhibiting the supply of power to at least load 13 when the monitored condition meets its preselected criteria, such as a preselected temperature value for instance, during at least one preselected part of the predetermined time period.

Figure 2A:
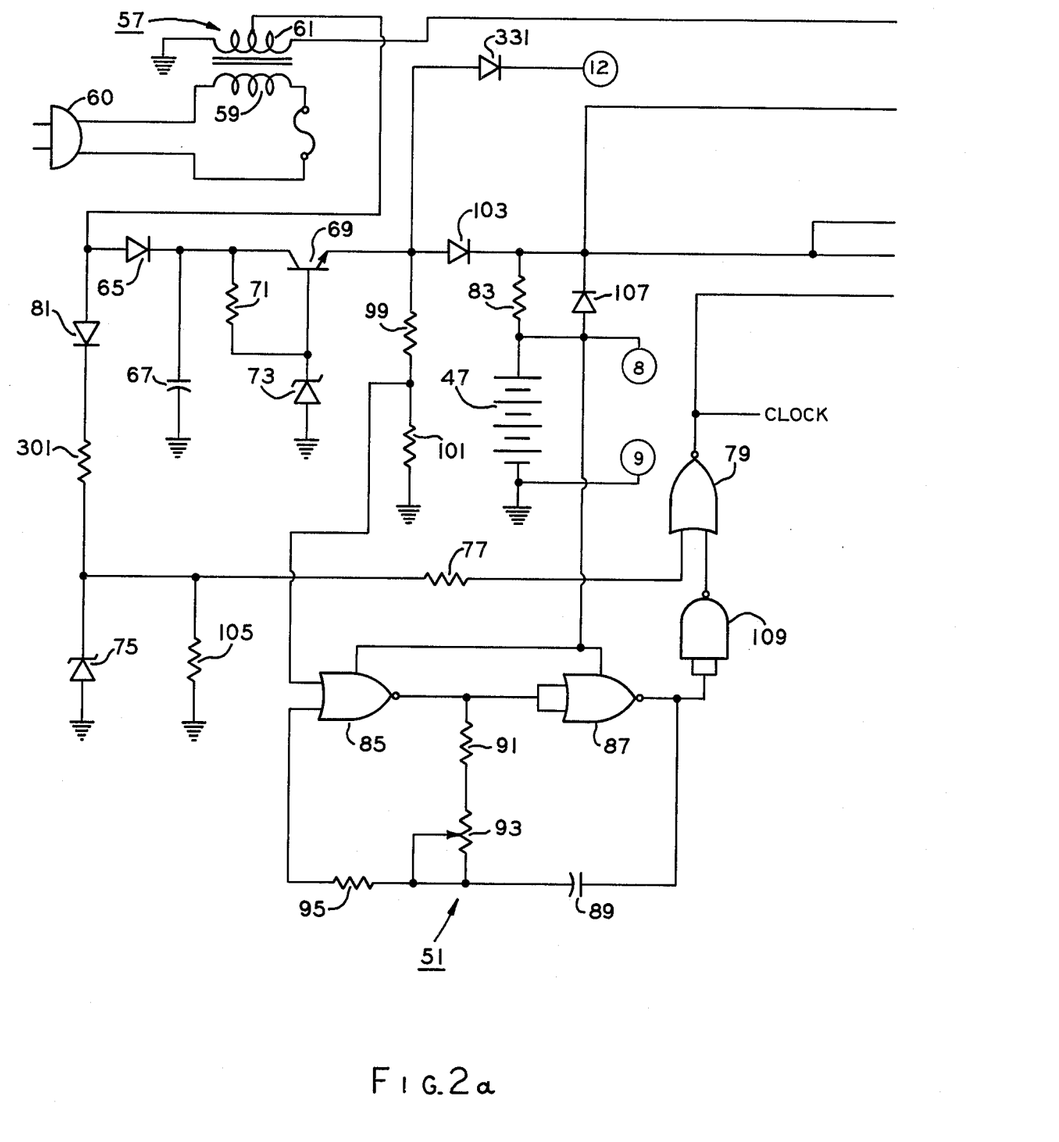
FIGS. 2a, 2b and 2c when joined together illustrate a detailed schematic diagram of the device of FIG. 1.
Figure 2B:
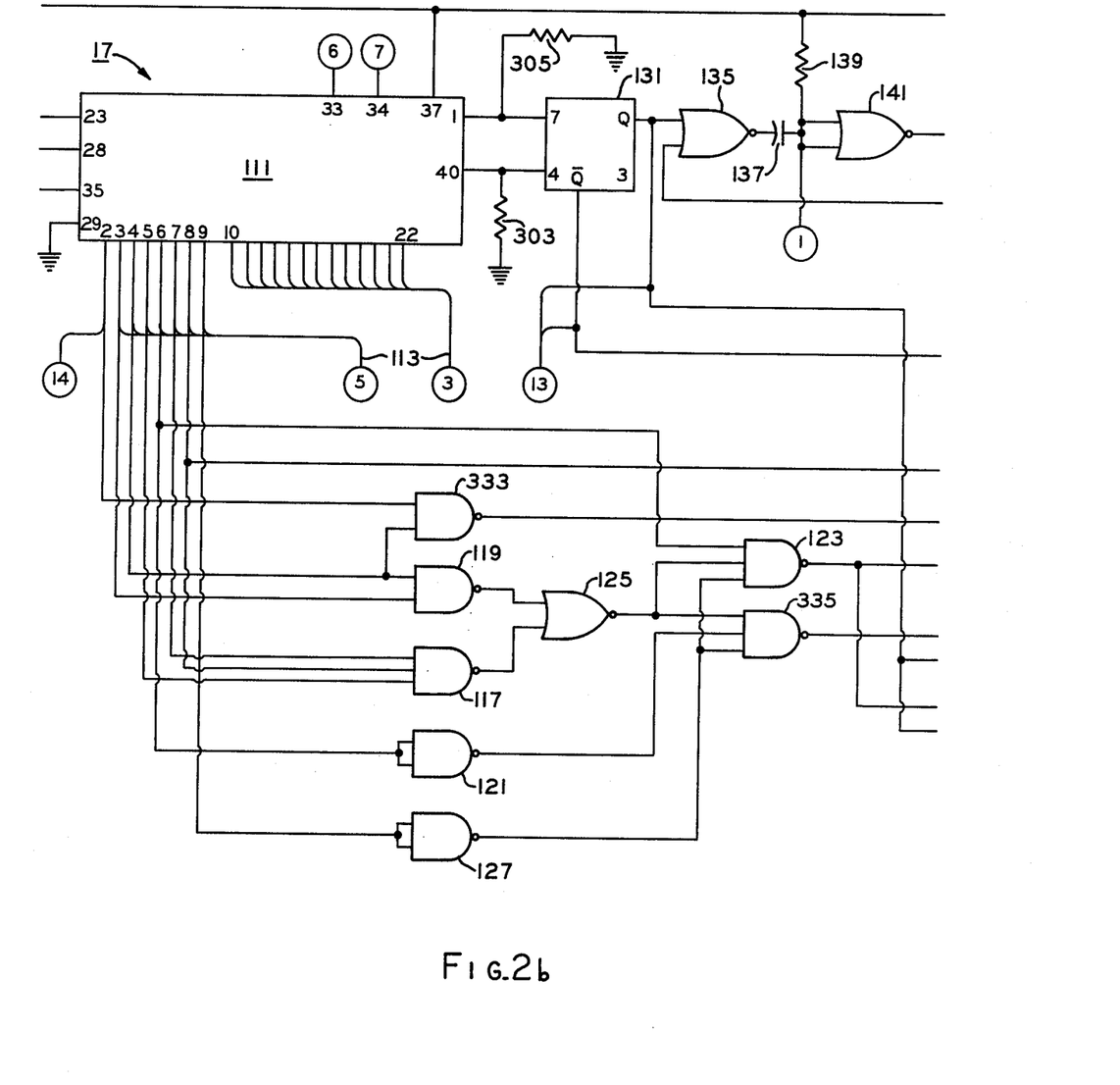
Figure 2C:
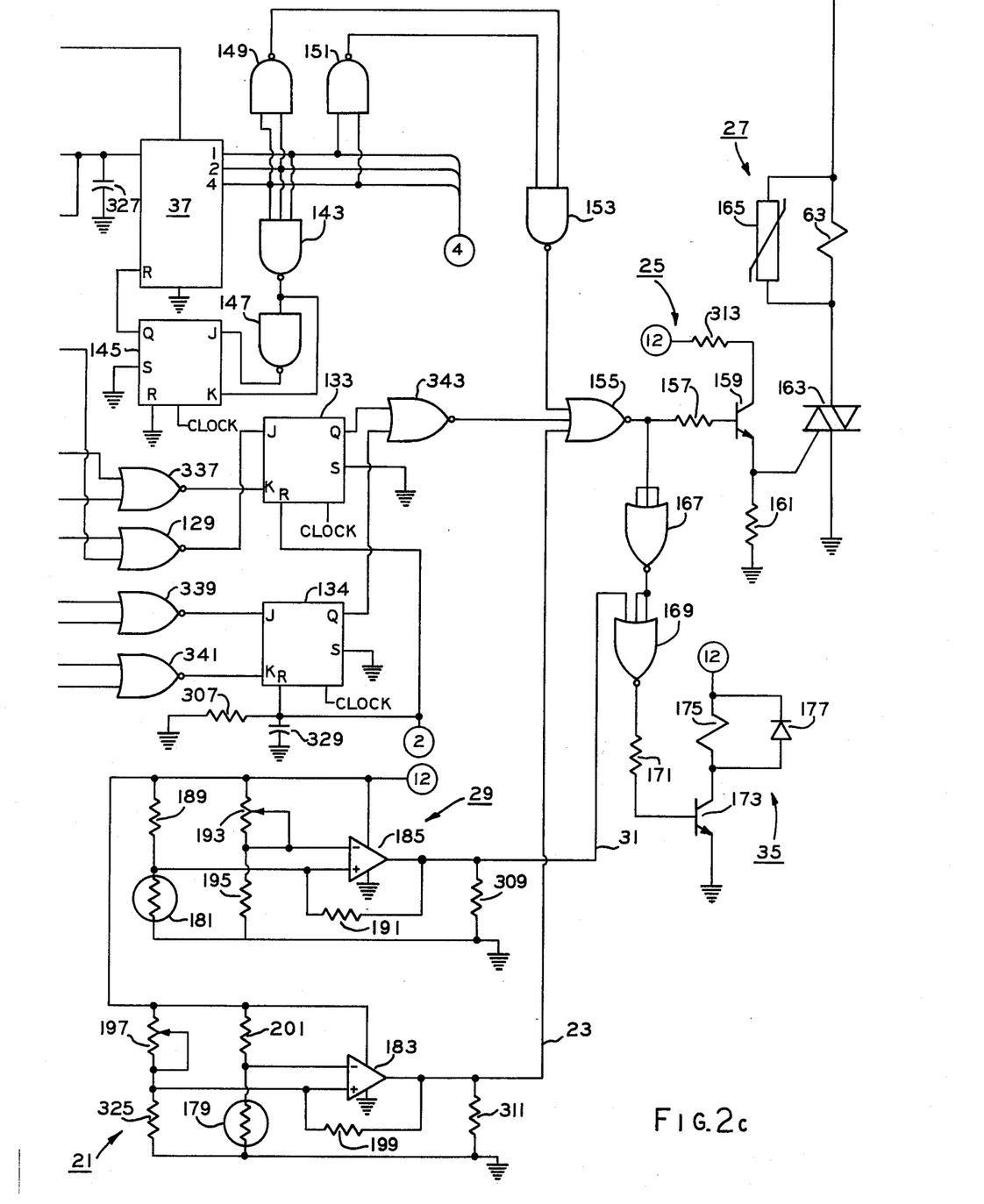

More particularly and with specific reference to FIGS. 2a, 2b and 2c, a step-down type transformer 57 has a fused primary winding connected to an electrical plug 60 for association with a standard 120 volt household outlet or alternating current power source (not shown), and the alternating current supplied by such source constitutes the timing signals. Transformer 57 also has a 25 volt center tapped secondary winding 61 thereby to provide an energizing current for a relay coil 63 as well as a regulated DC voltage which is half-wave rectified off the center tap of the secondary winding. This regulated voltage is half-wave rectified by a diode 65, filtered by a capacitor 67, and thereafter regulated by a transistor 69, a resistor 71 and a zener diode 73 connected in a known regulated power supply configuration. Timing pulses of 60 Hertz from secondary winding 59 of transformer 57 at the cathode of a zener diode 75 are supplied by way of a resistor 77 to one input of a NOR gate 79. These timing pulses are, of course, half-wave rectified by a diode 81 and are of about a 10 volt amplitude due to the zener action of zener diode 75.

Standby battery 47 is continuously charged through a resistor 83 which functions as a current limiting resistor. A pair of NOR gates 85, 87 along with a capacitor 89 and a plurality of resistors 91, 93, 95 generally constitute oscillator 51 which may be tuned to 60 Hertz by 93 which is of the variable type. Oscillator 51 will remain in a non-oscillating condition so long as the line voltage is performing the timing function since the junction between a pair of resistors 99, 101 will continuously supply a high or logical one signal to one of the inputs of NOR gate 85. This high input may be about 9 volts under normal operating conditions; however, in the event of the failure or loss of the line voltage, 60 Hertz timing pulses or signals are not supplied by way of resistor 77 to NOR gate 79. As a result, the regulated direct current supply is not available from transistor 69, and a diode 103 prevents battery 47 from providing a current flow to the voltage divider including resistors 99, 101. Therefore, the upper input to NOR gate 85 is effectively grounded by way of resistor 101, and the left input to NOR gate 79 is effectively grounded through a resistor 105. A diode 107 effectively bypasses resistor 83, and battery powered oscillation may now occur. The output of oscillator 51 is passed through a NAND gate 109 which functions as an inverter and provides isolation during normal operation when the line voltage is available.

To provide the aforementioned preselected time range or preselected part of the predetermined time period, assume that the preselected time range is chosen to be from 9:00 a.m. to 12:00 noon and/or from 5:00 p.m. to 9:00 p.m. for example. The nucleus of counting means 17 is an integrated circuit or circuit means 111, the output of which is logically combined in several NAND and NOR gates to provide a signal for indicating the establishment of the preselected time range. A different logical combination of the outputs of integrated circuit 111 would, of course, provide desired signals for other preselected time ranges. Integrated circuit 111 also provides outputs indicated generally on a line 113 by way of a fifty pin connector to service module 53 when connected therewith for displaying time of day. Integrated circuit 111 provides time of day signals in a seven segment code as well known to the art; however, a day of the week indication is not provided in the commercially available integrated circuit 111 and is generated by counter 37.

Figure 3:
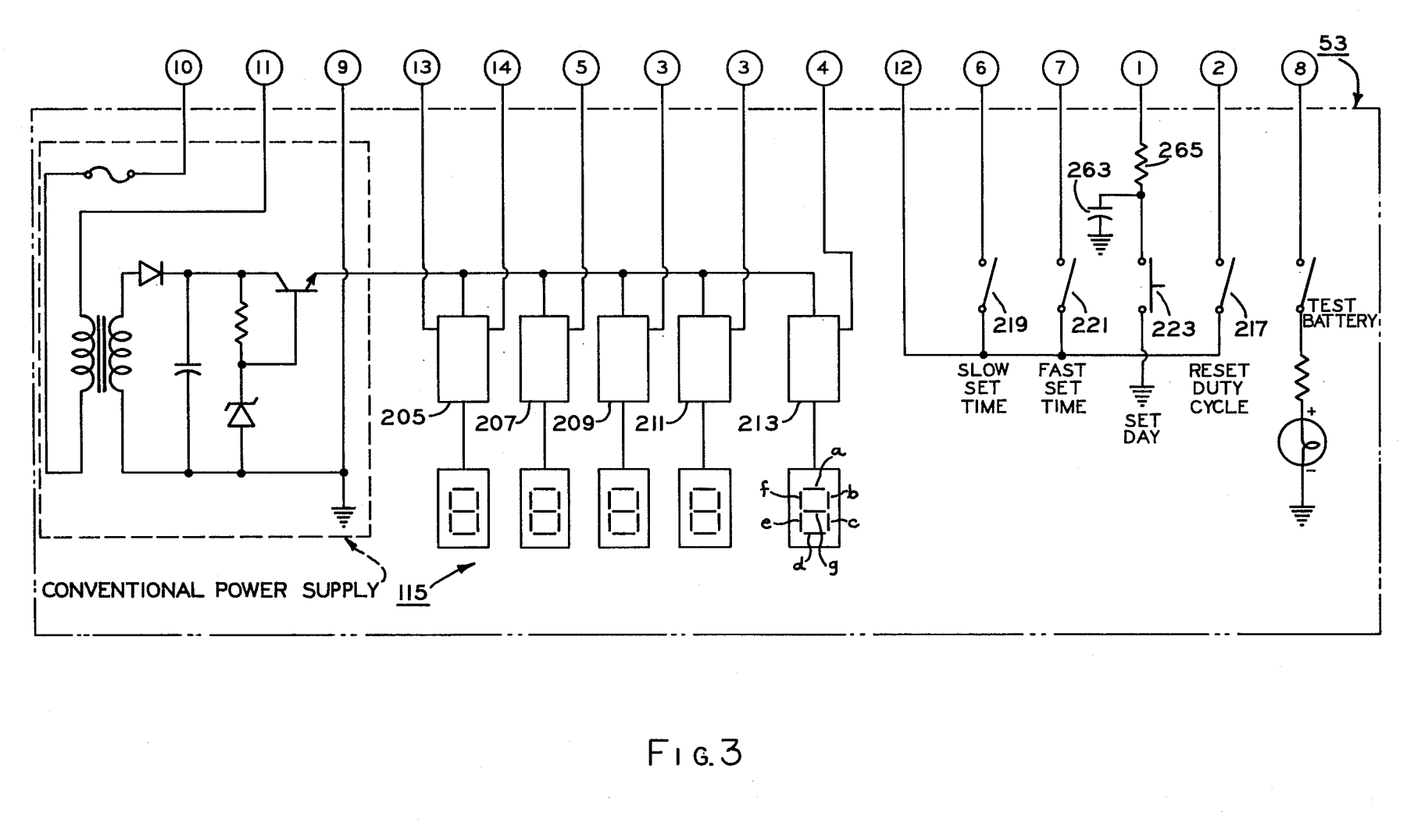
FIG. 3 is a schematic diagram of a service module for plug-in connection with the device of FIG. 1.

As an example, the 9:00 a.m. commencement of the preselected time range within the predetermined time period during which power supply inhibition may occur is traced through integrated circuit 111 as follows. The digit 9 in the seven segment code requires the energization of segments $a$, $b$, $c$, $d$, $f$, and $g$ but not $e$, which segments may be identified on a display unit 115 of service module 53, as shown in FIG. 3, as well as being shown above their respective pin numbers on integrated circuit 111. Outputs of $a$, $c$, $d$ are respectively connected to the inputs of a NAND gate 117 while the outputs of $g$, $f$ are connected to the inputs of a NAND gate 119, and the output of $d$ is connected to one input of a NAND gate 121 and also to one input of a NAND gate 123. When the outputs $a$, $c$, $d$, $f$, $g$, are high, i.e., a logical one, a NOR gate 125 has two low inputs and a high output. Segment $b$ on integrated circuit pin number 6 is also high for the digit 9, and these two high signals are supplied to NAND gate 123. Segment $e$, which must be low for the digit 9, is connected to an input of a NAND gate 127, the output of which is high and also supplied as the third input to NAND gate 123, the output of which is low when the digit 9 exists. This low outut from NAND gate 123 is supplied as one input to a NOR gate 129, the other input of which is the p.m. signal from a flip-flop 131. Thus the output of NOR gate 129 is high only at 9:00 a.m. When 9:00 a.m. arrives, the output of NOR gate 129 goes high setting another flip-flop 133. While only the signals for decoding the digit 9 in the seven segment code is discussed above, other preselected time indications may be decoded in a similar manner as is well known in the art; therefore, the other code requirement for indicating the termination of the aforementioned preselected time range is omitted for the sake of brevity.

When time advance causes integrated circuit 111 to switch from p.m. to a.m. flip-flop 131 changes to its set state thereby to cause the upper input of a NOR gate 135 to go high. NOR gate 135, a capacitor 137, a resistor 139 and a NOR gate 141 are connected as a "one shot" giving a short pulse as an input to 7 day counter 37 thus advancing it by one. 7 day counter 37 is a modulo 8 counter, as previously mentioned, having a binary output which must be decoded for a decimal readout. Counter 37 is connected to count from 0 through 6 representing the 7 days of the week, and when the output reaches count 7 (all three output lines high), the counter is immediately reset to count 0. When count 7 is indicated by counter 37, all three binary output lines are high causing the output of a NAND gate 143 and therefore also a K terminal input of another flip-flop 145 to be low. The low output from NAND gate 143 also causes a NAND gate 147 to provide a high signal as an input to a J terminal of flip-flop 145, and when the next 60 Hertz synchronizing clock pulse arrives at flip-flop 145, it changes state so that its Q terminal output goes high to reset counter 37. Means, such as a pair of NAND gates 149, 151 are employed for precluding operation of inhibiting means 25 during selected ones of the predetermined time period, i.e., to distinguish weekdays from Saturday and Sunday which correspond to counts or decimal outputs of 5 and 6, respectively, from counter 37. Thus NAND gates 149 will provide a low output only when counter 37 has a decimal 6 output, and NAND gate 151 will provide a low output only when the counter is in its decimal 5 condition. At all other times, the outputs of both NAND gates 149, 151 are high thereby to give a low output from a NAND gate 153 for counts of 0 through 4 of counter 37 which correspond to weekdays.

On weekdays, the upper input of a NOR gate 155 is low, and during the preselected time ranges of 9:00 a.m. to 12:00 a.m. and/or again at 5:00 p.m. through 9:00 p.m., the middle input of NOR gate 155 is low. Assuming that the lower input of NOR gate 155 is low due to an indication that the outdoor temperature is below 24° F., NOR gate 155 provides a high output to initiate the power supply inhibiting function. This high or inhibit signal by way of a resistor 157 turns on a transistor 159, and conduction through the transistor and a resistor 161 gates an alternating current switch, such as a Triac 163, into its conducting state energizing relay 63 to disable, for example, load 33. A metal oxide varistor 165 may be included in parallel with relay coil 63 for transient suppression purposes.

The high output from NOR gate 155 causes the output of a NOR gate 167 to go low, and assuming that a low signal indicative of the indoor temperature being above 60° F. is being received on line 31, a NOR gate 169 provides a high output providing a base drive current by way of a resistor 171 to a transistor 173 enabling that transistor to conduct and energize a relay coil 175 which is a control relay on the electric heating apparatus for the space being heated. Thus, conduction by transistor 173 causes the electric heating to be inhibited. A diode 177 is similarly included in parallel with relay coil 175 for transient suppression purposes. NOR gate 169 receives its indoor cold temperature override signal on line 31, and for example, if the indoor temperature drops below 60° F., line 31 goes high which, in turn, causes the output of NOR gate 169 to go low thereby to turn off transistor 173 and allow relay 175 to "drop out" so that electric heating is restored.

The indoor and outdoor temperature sensing functions of sensors 21, 29 are performed by temperature responsive impedances, such as negative temperature coefficient resistors 179, 181, respectively, and each employs bistable circuit means, such as operational amplifier 183, 185, respectively, connected as a comparator and having a certain hysteresis associated therewith. Suppose, for example, the supply of power to load 13 has been inhibited so that the heated space is cooling off. Under these circumstances, the resistance of temperature sensitive resistor 181 increases so as to supply an increasing or a higher and higher input to the positive input of operational amplifier 185, as determined by the voltage dividing effect of a resistor 189 and temperature sensitive resistor 181. When the preselected criteria or threshold of 60° F. is reached, the output of operational amplifier 185 switches from low to high thereby providing the above discussed override function so that the heating of the heated space resumes. The value of a resistor 191 determines the hysteresis effect, and when the indoor temperature again reaches another preselected criteria or threshold therefor, such as 70° F., operational amplifier 185 again switches to a low output state. Operational amplifier 185 receives its negative input from a voltage divider, such as a pair of resistors 193, 195, with resistor 193 being variable to change the threshold temperature. Operational amplifier 183 functions in an analogous manner with its preselected criteria or threshold temperature being set by a potentiometer 197; however, it may be noted that only a 2° F. difference or hysteresis occurs due to the effect of a much larger feed back resistor 199 and, further, that the negative input of amplifier 183 is the one receiving information from the voltage divider effect of a resistor 201 and temperature sensitive resistor 179. Thus, the output of operational amplifier 183 is low when the outdoor temperature is below 24° F. and high when the outdoor temperature is above 24° F.

Figure 4:
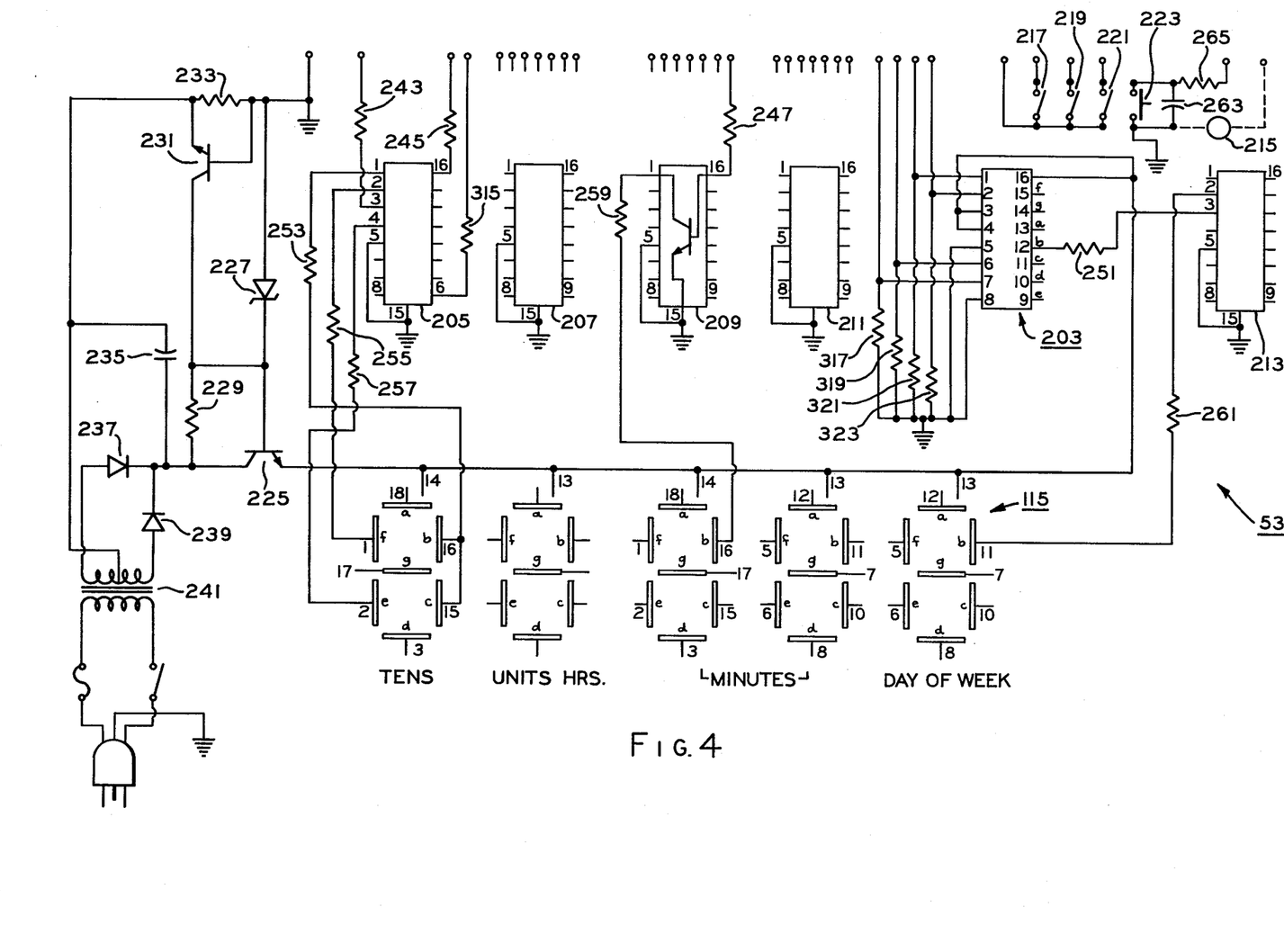
FIG. 4 is a schematic diagram in greater detail of the service module of FIG. 3.

Referring now to FIGS. 3 and 4, service module 53 is depicted with circled terminals at the top thereof indicating generally the interconnection between a 50 pin connector on that service module and corresponding portions of the remaining circuitry. Service module 53 is a temporary plug-in unit for setting initial conditions or for servicing purposes and, in general, contains a power supply and visual indicators for the time of day and day of the week. The visual indicators are seven segment display devices with each having a corresponding driver, and since the day of the week is not already in seven segment code, a binary coded decimal to seven segment decoder 203 is included. Drivers 205, 207, 209, 211, 213 each contain 7 transistors to drive the respective display segments with driver 207 illustrating a typical internal connection for one segment. Decoder 203 is interposed prior to driver 213 to decode the binary output of counter 37. Service module 53 also contains a meter 215 which functions as a battery voltage monitor for checking the condition of battery 47. A switch 217 is provided for resetting flip-flops 133, 134, and another switch 219 is a slow set time control. A switch 221 is provided for a fast set time control of integrated circuit 111, and switch 223 is used to manually advance the day of week count.

In service module 53, a transistor 225 in conjunction with a zener diode 227 and a resistor 229 constitute a voltage regulated power source within a transistor 231 and a resistor 233 functioning as a current limiting combination for protecting the power supply. A capacitor 235 functions as a filter capacitor, and a pair of diodes 237, 239 in conjunction with a center tapped transformer 241 constitute a full-wave power supply. Resistors 243, 245, 247, 251 are typical base current limiting resistors for the respective driver transistors while resistors 253, 255, 257, 259, 261 function as current limiting resistors between the respective driver transistors and digit segments. A capacitor 263 and a resistor 265 function to prevent any switch bounce effect.

Referring again to FIGS. 2a, 2b and 2c, device 55 may also include a plurality of resistance or resistors 301 – 325, and these resistances are employed for voltage level biasing purposes or for other similar conventional purposes. Capacitors 327 and 329 are employed in logic circuit 25 for similar conventional purposes, and a diode 331 is also employed for conventional purposes. A NAND gate 333 is connected with integrated circuit 111 generally in the same manner as NAND gates 117, 119, 121 and 127 and serves generally the same purpose, i.e., converting the signal of the integrated circuit. Another NAND gate 335 is connected with the input of NAND gate 123 and the outputs of NAND gates 121, 127, and gate 335 serves generally the same purpose as gate 123. A plurality of NOR gates 337, 339, 341 are also connected in logic circuit 25 and perform generally the same function as NOR gate 129, as previously discussed, and another NOR gate 343 has its inputs connected with flip-flops 133, 134 and its output connected with an input of NOR gate 155.

| Exemplary Component Values | |
|---|---|
| Resistors: | |
| 301, 305, 303, 307, 309, 311, 171, 157, 161, 243, 245, 111, 112, 113, 114, 315, 317, 319, 321, 323, 251, 265, 247 | 10K |
| 105 | 100K |
| 71, 229 | 390 OHMS |
| 99 | 3.3K |
| 101, 83 | 68 OHMS |
| 77, 95 | 470K |
| 91 | 47K |
| 93 | 50K variable |
| 139 | 82K |
| 189, 195, 201 | 5K |
| 181 | 5K at 60° F. |
| 197, 193 | 7K variable |
| 325 | 20K |
| 179 | 20K at 24° F. |
| 191 | 22K |
| 199 | 220K |
| 313 | 100 OHMS 2 watt |
| 253 | 470 OHMS |
| 255, 257, 259, 261 | 1K |
| Capacitors: | |
| 67 | 500 Mfd. 50 volt |
| 89, 137, 329 | .1 Mfd. |
| 327 | .02 Mfd. |
| 235 | 220 Mfd. 25 volt |
| 263 | .068 Mfd. |
| Diodes: | |
| 81, 65, 331, 103, 107, 177, 239, 237 | |
| 7 segment drivers | |
| 205, 207, 209, 211, 213 | type CA 3081 |
| 7 segment displays | |
| 115 | type DL 727 two digit |
| Meter | |
| 215 | 0–15 volt DC |
| BCD to 7 segment converter: | |
| 203 | type CD4511B |
| Operational Amplifiers: | |
| 185, 183 | type 1458 |
| AC Solid State Switch: | |
| 163 | SC 141-TRIAC |
| Clock Integrated Circuit: | |
| 111 | AMI #S1998, NS #MM5316 |
| Flip-flops: | |
| 131, 145, 133, 134 | type 4027 J-K flip-flops |
| Counter: | |
| 37 | type 4040A 12 stage binary ripple counter |
| Relays: | |
| 175, 63 | |
| Battery: | |
| 47 | 9.6 volt nickel-cadmium |
| Zener Diodes: | |
| 73 | 15 volt |
| 75, 227 | 10 volt, ½ watt |
| Transistors: | |
| 69 | |
| 159, 173 | 2N5305 |
| 231 | 2N5172 |
| 225 | D42C5 |
| NOR gates: | |
| 85, 87, 79, 125, 235, 343, 141, 129, 337, 339, 341 | Type 4001 multiple gate unit |
| 155, 167, 169 | Type 4025 multiple gate unit |
| NAND gates: | |
| 109, 333, 119, 121, 127, 147, 153 | Type 4011 multiple gate unit |
| 117, 123, 335, 149, 151, 143 | Type 4023 multiple gate unit |

Although not shown or previously discussed, it is well known in the art to regulate the operation of load 13 by a conventional room or space thermostat which, of course, would be subjected to the temperature of the space being heated; however, the operation of such conventional room thermostat would be overriden or subject to the operation of device 55 under the conditions discussed hereinbefore.

While the foregoing has been discussed with respect to controlling the power supply to load 13, i.e. electrical heating apparatus, it is contemplated within the scope of the invention that load 13 may be air conditioning apparatus, and this context it is apparent that the preselected criteria or threshold temperatures for sensors 21, 29 may be altered so as to complement the desired temperature conditions involved in air conditioning a space. Also, an integrated circuit could be devised to provide both the time of day signals and the day of week signals rather than employing separate counting means 17 and 7 day counter 37. Further, other predetermined time periods and preselected time ranges could be specified for power supply inhibition purposes, and various customers of the electric utility company may have different specified preselected time ranges.

From the foregoing, it is now apparent that a novel device 55, systems and methods for controlling the supply of power to a load have been presented meeting the objects and advantageous features set out hereinbefore, as well as others, and it is contemplated that changes as to the precise arrangements, details and connections of the component parts as well as alterations in the method steps may be made by those having ordinary skill in the art without departing from the spirit of the invention or scope thereof as set out in the claims which follow.

What I claim as new and desire to secure by Letters Patent of the United States is:

1. A device for controlling a supply of power from a source thereof to a load comprising:
   integrated circuit means for counting timing signals supplied thereto and operable generally to sequentially increment a count stored therein so as to provide output signals according to the stored count representing a predetermined time period;
   means including a plurality of gates responsive to said integrated circuit means to provide output signals for indicating at least one preselected range of time within the predetermined time period;
   means for monitoring a temperature including a temperature responsive impedance, and bistable circuit means controlled by a voltage across said temperature responsive impedance and switchable between a first state when the monitored temperature is in a first temperature range and a second state when the monitored temperature is in a second temperature range; and
   means responsive to said bistable circuit means and the output signal of said indicating means for inhibiting the supply of power from the source thereof to the load when the monitored temperature is within one of the first and second temperature ranges only during the at least one preselected time range.

2. A device as set forth in claim 1 wherein said inhibiting means includes gate means having inputs for respectively receiving output signals from said indicating means and output signals from said bistable circuit means indicative of the state thereof.

3. A device as set forth in claim 2 wherein said inhibiting means further includes a semiconductor device coupled with said gate means and adapted to be rendered conductive thereby so as to effect the inhibition of the power supplied to the load.

4. A device for controlling the supply of power to an electrical load comprising:

means for counting generally uniform repetitive timing signals supplied thereto during at least one predetermined time period;

means associated with said counting means for indicating at least one range of time within the at least one predetermined time period;

means for monitoring an ambient condition; and means responsive to said monitoring means and said indicating means for inhibiting the supply of power to the electrical load when the monitored condition meets preselected criteria therefor during the at least one time range.

5. A device for controlling the supply of power to at least one electrical load comprising:

means for timing through at least one predetermined time period;

a pair of means for monitoring a pair of temperature conditions, respectively; and means for inhibiting the supply of power to the at least one electrical load when the monitored conditions meet preselcted criteria therefor, respectively, only during a preselected time range within the at least one predetermined time period.

6. A device as set forth in claim 5 wherein said timing means includes for counting the timing signals through the at least one predetermined time period.

7. A device as set forth in claim 5 wherein said timing means includes means for indicating the preselected time range.

8. A device as set forth in claim 5 wherein one of said monitoring means comprises means for sensing atmospheric temperature.

9. A device as set forth in claim 5 wherein the at least one load includes apparatus for conditioning the temperature of a space, and one of said monitoring means comprising means for sensing the temperature of the space.

10. A device as set forth in claim 5 wherein said inhibiting means includes means responsive to one of said monitoring means for precluding the inhibition of the power supply to the at least one load when said one monitoring means meets other preselected criteria therefor.

11. A device as set forth in claim 5 further comprising auxiliary means associated with said timing means for operating it in the event of a failure of the timing signals supplied to said timing means.

12. A system for controlling the supply of power to at least one electrical load comprising:

means operably generally in response to repetitive timing signals supplied thereto for counting through a plurality of predetermined time periods;

means for connecting said counting means with the power source so that the alternating current thereof comprises the timing signals;

means for monitoring an ambient condition; and means coupled with said counting means and said monitoring means and operable generally for inhibiting the supply of power from the source thereof to the at least one electrical load when the monitored condition attains a preselected criteria therefor during at least one selected part of selected ones of the predetermined time periods.

13. A system as set forth in claim 12 further comprising other means for monitoring another condition, said inhibiting means being operable when the first named monitored condition attains its preselected criteria conjointly with another condition meeting preselected criteria therefor during the selected part of the selected ones of the time periods.

14. A system as set forth in claim 13 wherein said inhibiting means includes means responsive to said other monitoring means for precluding the operation of said inhibiting means when the other monitoring means attains other preselected criteria therefor.

15. A system as set forth in claim 12 further comprising means for correcting the count of said counting in the event it differs from the predetermined time period, said correcting means being manually connected in electrical association with said counting means.

16. A system as set forth in claim 12 further comprising auxiliary means operable generally automatically for supplying other timing signals to said counting means in the event of the failure of the timing signals supplied thereto.

17. A system as set forth in claim 12 further comprising means for precluding the operation of said inhibiting means during predetermined time periods other than the selected ones thereof.

18. A method of controlling the supply of power to an electrical load comprising the steps of:

counting timing signals through a predetermined time period with the timing signals comprising alternating current of source thereof and establishing a preselected range of time within at least a portion of the predetermined time period;

monitoring an ambient condition during the predetermined time period; and inhibiting the supply of power to the load when the monitored condition attains preselected criteria therefor only during the preselected time range.

19. A method of controlling the supply of power to at least one electrical load comprising the steps of:

timing through at least one predetermined time period;

monitoring a pair of temperature conditions during the at least one predetermined time period; and inhibiting the supply of power to the electrical load when the monitored conditions each meet preselected criteria therefor only during a preselected part of the at least one predetermined time period.

20. The method as set forth in claim 19 comprising the additional step of precluding the inhibiting step when one of the monitored conditions meets other preselected criteria therefor.

21. The method as set forth in claim 19 wherein the timing step includes establishing at least one preselected time range within the at least one predetermined time range so as to comprise the preselected part thereof.

22. The method as set forth in claim 19 wherein the load is apparatus for conditioning the temperature of a space, and wherein the monitoring step includes sensing the temperature of the space which comprises one of the monitored conditions.

23. The method as set forth in claim 22 comprising the additional step of precluding the inhibiting step when the sensed temperature of the space meets other preselected criterial therefor.

24. The method as set forth in claim 19 wherein the monitoring step includes sensing the atmospheric temperature which comprises one of the monitored conditions.

25. The method as set forth in claim 19 wherein the timing step includes counting timing signals provided from an alternating current source thereof and comprising the alternating current.

26. The method as set forth in claim 25 comprising the additional step of providing an auxiliary source of timing signals so as to be counted during the counting step in the event of the failure of the alternating current.

27. The method as set forth in claim 25 comprising the additional step of periodically correcting the timing of the timing step so as to ensure the accuracy of the at least one predetermined time period.

* * * * *

UNITED STATES PATENT AND TRADEMARK OFFICE
CERTIFICATE OF CORRECTION

PATENT NO. : 4,110,632
DATED : August 29, 1978
INVENTOR(S) : Alvin D. Wyland

It is certified that error appears in the above–identified patent and that said Letters Patent are hereby corrected as shown below:

Col. 1, line 32, after "between" insert --about--.
Col. 11, line 5, after "315" insert --,--.
Col. 13, line 25, after "includes" insert --means--.
Col. 16, line 1, delete "periodically" and insert --aperiodically--.

Signed and Sealed this

First Day of May 1979

[SEAL]

Attest:

RUTH C. MASON
Attesting Officer

DONALD W. BANNER
Commissioner of Patents and Trademarks